UNITED STATES PATENT OFFICE.

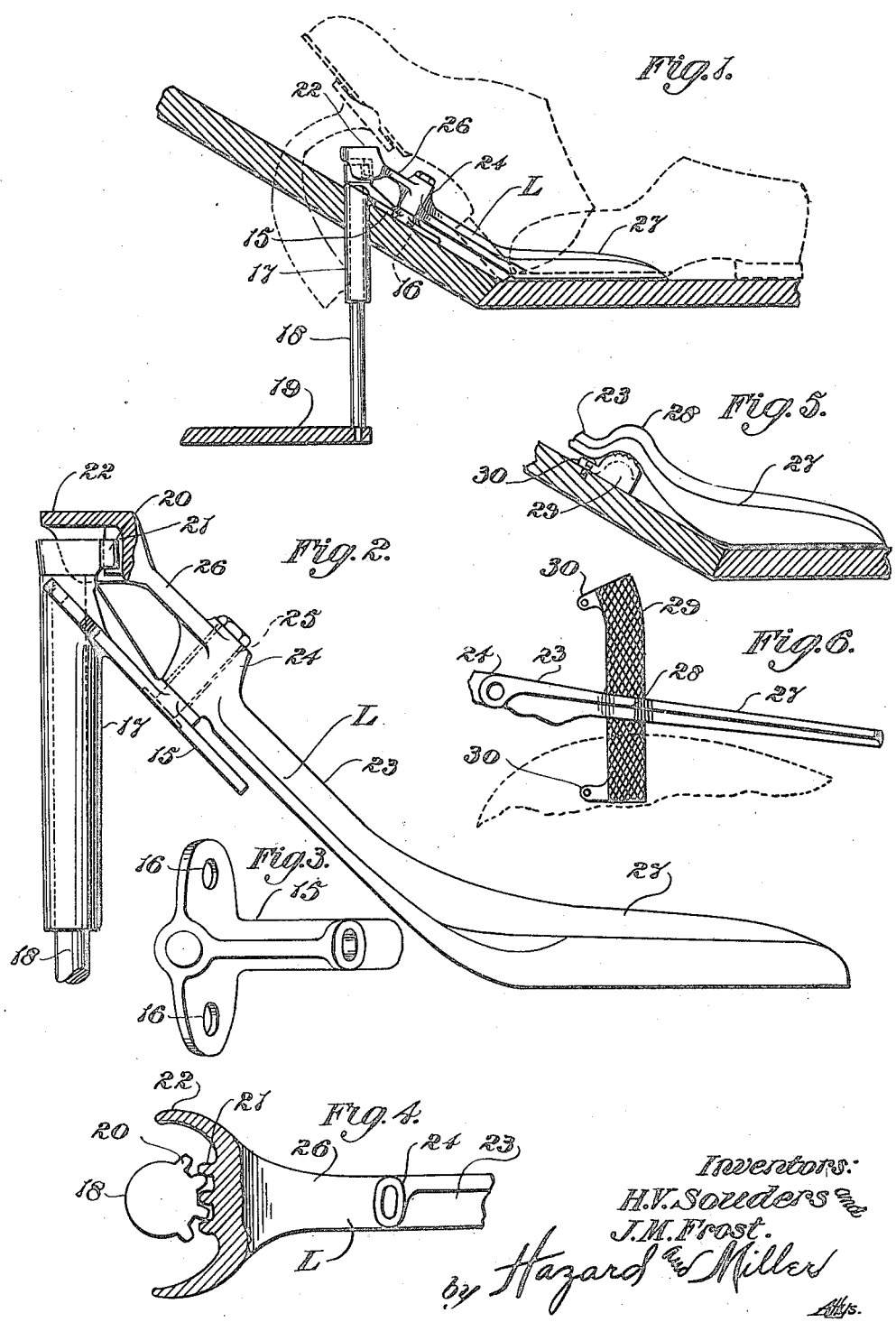

HERBERT V. SOUDERS, OF WILMINGTON, AND JESSE M. FROST, OF LONG BEACH, CALIFORNIA.

FOOT ACCELERATOR.

1,423,489.  Specification of Letters Patent.  Patented July 18, 1922.

Application filed December 29, 1921. Serial No. 525,612.

*To all whom it may concern:*

Be it known that we, HERBERT V. SOUDERS and JESSE M. FROST, citizens of the United States, residing at Wilmington and Long Beach, in the county of Los Angeles and State of California, have invented new and useful Improvements in Foot Accelerators, of which the following is a specification.

Our invention relates to foot accelerators for internal combustion engines of motor vehicles, and particularly to that type of accelerator embodied in our co-pending application Serial No. 502,326, filed September 22, 1921.

It is a purpose of our present invention to provide a foot accelerator which permits the operator's foot to repose on the brake pedal while at the same time having operative engagement with the accelerator, thereby allowing actuation of the accelerator without removing the foot from the brake pedal thus facilitating the control of a motor vehicle particularly in congested districts.

It is also a purpose of our invention to provide a foot accelerator which allows of the operator's foot resting on the floor of the vehicle to permit of the desired relaxation particularly when it is desired to maintain a constant speed as when traveling through uncongested districts.

A further purpose of our invention is the provision of an accelerator pedal adapted for use in conjunction with a foot rest, the latter being designed for unusually short operators in supporting the foot in operative relation to the pedal.

We will describe two forms of foot accelerators each embodying our invention and will then point out the novel features thereof in claims.

In the accompanying drawings,—

Figure 1 is a view showing the section of a motor vehicle flooring and a portion of a throttle actuating mechanism and having applied thereto one form of foot accelerator embodying our invention.

Fig. 2 is an enlarged detail view showing in side elevation the foot accelerator shown in Fig. 1 with a part thereof broken away.

Fig. 3 is a top plan view of the base plate comprised in the accelerator shown in the preceding views.

Fig. 4 is a top plan view partly in section showing the operative connection between the shaft and pedal of the accelerator.

Fig. 5 is a view showing in side elevation a modified form of pedal and foot rest in applied position with respect to the flooring of a vehicle, and also embodying our invention.

Fig. 6 is a top plan view of Fig. 5.

Similar reference characters refer to similar parts in each of the several views.

Referring specifically to the drawings, our invention, in its present embodiment, comprises a base plate 15 provided with openings 16 through which suitable fastening members are adapted to extend for securing the plate on the inclined floor boards of a motor vehicle and at a point adjacent to and at the right of the clutch pedal of a motor vehicle. Formed integral with this plate is a vertically disposed bearing sleeve 17 in which is journaled a shaft 18 carrying at its lower end a crank arm 19 adapted to be connected to a rod (not shown), which latter extends forwardly to and provides the operating means for the throttle lever of a carbureter. The upper end of the shaft is provided with the quadrant or segmental gear 20 which, as shown in Figs. 2 and 4, is adapted to mesh with rack teeth 21 formed on the upper end of the lever designated generally at L. At this same end and partially inclosing the rack teeth is a hood 22, the lips or ends of which are disposed at opposite sides of the shaft 18 for a purpose which will be hereinafter described.

As illustrated to advantage in Fig. 2, the lever L includes an inclined portion 23 having one end thereof terminating in a hub or bearing 24 through which a pin 25 extends for pivotally sustaining the lever as a unit upon the base plate 15. Extending upwardly from the hub 24 is an arm 26 carrying at its end the hood 22 and the rack teeth 21. The lower end of the portion 23 is extended to form a horizontal portion 27, which is of increased vertical dimension to provide a relatively wide side against which the foot of the operator is adapted to engage in effecting operation of the lever. In the applied position of the lever as shown in Fig. 1, the portion 23 is disposed in spaced parallelism with relation to the inclined floor boards, while the horizontal portion 27 is similarly disposed with respect to the horizontal floor boards so that the lever is free to swing upon the pin 25 when the plate is secured to the floor boards as has been described.

In operation, the portions 23 or 27 are adapted to be engaged by the heel or toe of the operator's foot as indicated in dash lines in Fig. 1 so that when the foot is moved to the right, a reverse movement is imparted to the rack teeth 21 thereby causing the latter to co-act with the quadrant 21 in effecting a partial rotation of the shaft 18, it being understood that movement of the shaft actuates the shank 19 in causing an operation of the throttle. In moving the lever in either direction, the ends of the hood 22 abut the gear 20 in limiting the movement of the lever as will be understood. As previously described, the foot accelerator is adapted to be arranged adjacent to the brake pedal which, as illustrated in dash lines in Fig. 1, can be actuated with the heel of the operator's foot when the latter is positioned upon the brake pedal. This manner of operation is particularly desirable when operating a motor vehicle in traffic congested districts. When traveling through uncongested districts, the foot may repose on the horizontal floor boards as indicated in dash lines in Fig. 1, where it will be disposed at one side of the portion 27 of the lever so that by lateral shifting of the foot an operation of the lever can be effected to operate the shaft 15.

Referring now to Figs. 5 and 6, we have here shown a modified form of lever which is similar in construction to the lever L, but is provided with an upwardly bent portion 28 between the portions 23 and 27 which is designed to accommodate the foot rest 29 having terminal ears 30 for securing the rest as a unit to the inclined floor boards. The curvature of the foot rest is such as to allow unrestricted movement of the lever in effecting an operation of the shaft 18, the foot of the operator being associated with the rest and lever in a manner indicated in dash lines in Fig. 6. It will here be noted that the foot rest 29 serves to maintain the operator's foot in proper operative relation with respect to the lever. It is to be understood that the foot rest 29 can be associated with the lever in various other ways, and that we do not wish to be restricted to the precise application illustrated.

Although we have herein shown and described only one form of foot accelerator embodying our invention, it is to be understood that various changes and modifications may be made herein without departing from the spirit of the invention and the spirit and scope of the appended claims.

We claim as our invention:

1. A foot accelerator comprising a lever fulcrumed between its ends, rack teeth formed on the lever, a shaft, a quadrant formed on the shaft and meshing with said rack teeth, and a hood formed on the lever and engageable with the shaft to limit the movement of the lever in either direction.

2. A foot accelerator comprising a relatively narrow lever including an inclined portion, a horizontal portion, a base plate, a pin extending through the base plate and lever for pivotally supporting the lever, rack teeth on one end of the lever, a shaft, a quadrant on the shaft meshing with said rack teeth, and a hood formed on the lever and engageable with the shaft for limiting the pivotal movement of the lever in either direction.

3. A foot accelerator comprising a lever including an inclined portion and a horizontal portion, means for pivotally sustaining the lever so that the same is adapted for swinging movement over the floor boards of a motor vehicle, a foot rest beneath the lever, a shaft having operative connection with the lever, and means carried by the lever and engageable with the shaft for limiting the movement of the lever in one direction or the other.

In testimony whereof we have signed our names to this specification.

HERBERT V. SOUDERS.
JESSE M. FROST.